2 Sheets—Sheet 1.

C. MUSGROVE.
Planter.

No. 212,564. Patented Feb. 25, 1879.

WITNESSES
Wm A Skinkle
Geo N Breck

INVENTOR
Charles Musgrove
By his Attorneys
Baldwin, Hopkins, & Peyton

2 Sheets—Sheet 2.

C. MUSGROVE.
Planter.

No. 212,564. Patented Feb. 25, 1879.

WITNESSES
Wm A. Skinkle
Geo W Breck

INVENTOR
Charles Musgrove
By his Attorneys
Baldwin, Hopkins, & Peyton

UNITED STATES PATENT OFFICE

CHARLES MUSGROVE, OF LIBERTY, ASSIGNOR OF ONE-THIRD HIS RIGHT TO WILLIAM L. COLEMAN, OF BEDFORD COUNTY, VIRGINIA.

IMPROVEMENT IN PLANTERS.

Specification forming part of Letters Patent No. 212,564, dated February 25, 1879; application filed December 31, 1878.

*To all whom it may concern:*

Be it known that I, CHARLES MUSGROVE, of Liberty, in the county of Bedford and State of Virginia, have invented certain new and useful Improvements in Planters, of which the following is a specification:

My improvements relate to that class of planters in which the grain is dropped from a receptacle opposite the center of a traction-wheel down through radial apertures in an annular flange projecting from one side of the wheel, and thence through a delivery-pipe to the ground; and their object is to provide convenient means for determining at will the amount of grain to be dropped at once and the number of drops per revolution of the traction-wheel, and to provide convenient means for covering the dropped grain.

My improvements consist in the combinations of parts hereinafter described in detail, and specifically claimed as organized in my improved planter.

Figure 1:
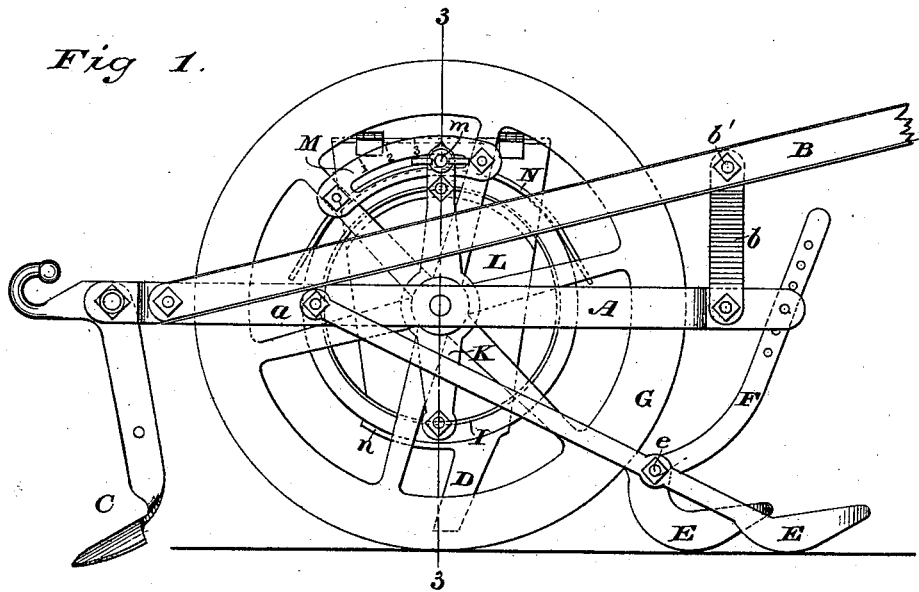
Figure 2:
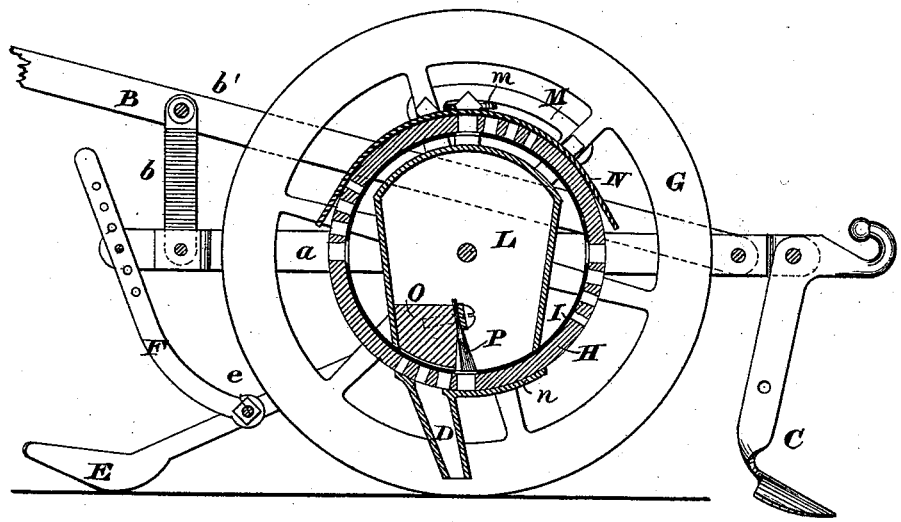
Figure 3:
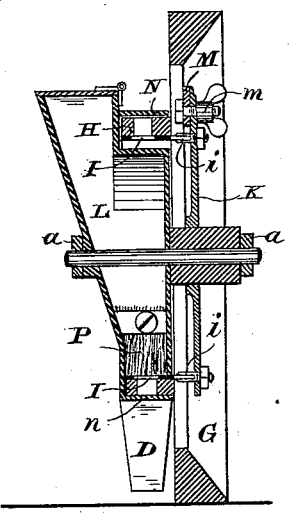
Figure 4:
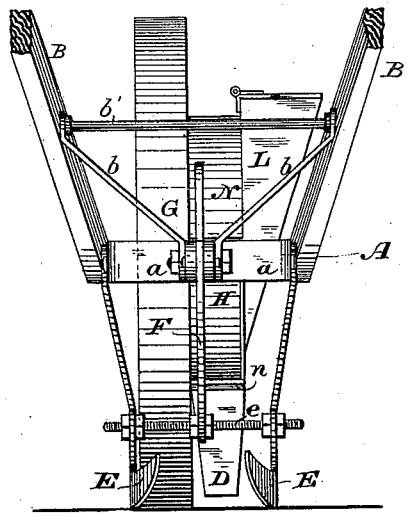
Figure 5:
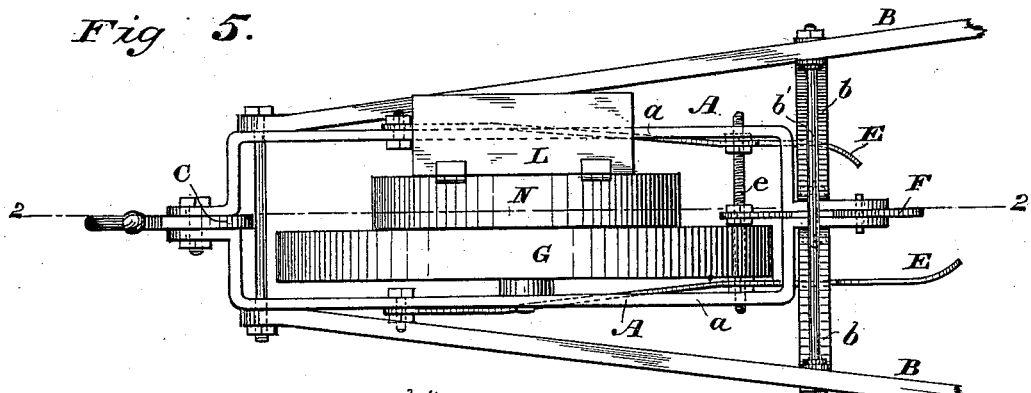
Figure 6:
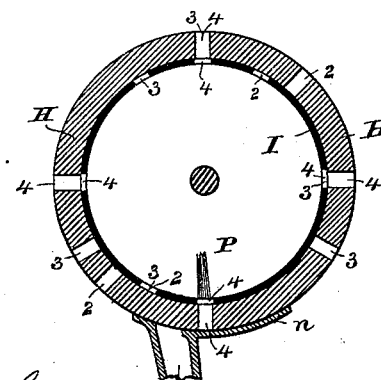

In the accompanying drawings, Figure 1 is a side elevation of a planter embodying my improvements. Fig. 2 is a vertical longitudinal section of the same through the line 2 2 of Fig. 5. Fig. 3 is a vertical cross-section through the line 3 3 of Fig. 1. Fig. 4 is a rear elevation. Fig. 5 is a plan or top view, and Fig. 6 is a section, of the apertured flange and contained band through the line 2 2 of Fig. 5.

A indicates the frame, which is conveniently formed of two metal sections, *a a*, united at front and rear. B B are handles, attached to the front end of the frame and supported by braces *b b*, secured to the rear end of the frame and stayed by the usual round *b'*. C is a detachable furrower, bolted onto the front end of the frame, and located substantially in line with the drop-tube D, so that the dropped grain shall fall in the furrow made by the furrower. E E are coverers, pivoted to the opposite sides of the frame and connected together for lateral adjustment by a screw-bolt, *e*. Attached to this screw-bolt is a rod, F, passing upward through a mortised projection on the rear of the frame, and provided with pin-holes and a pin for vertical adjustment of the coverers. These coverers straddle the drop-furrow and are curved on their under sides to avoid catching on roots or other obstructions, and are bent inward, so as to turn the loose earth into the drop-furrow and cover the grain. They are not located opposite each other, as usual, but one is farther to the rear than the other to prevent interference and clogging, and this arrangement is found to be a material improvement in practical working.

G is the traction or drive wheel, which should have a tread of about two inches in width, and its felly is perpendicular on the drop side and inclined on the other side. Secured concentrically to the flat side of this wheel is an annular projection or flange, H, which turns with the wheel and is provided with grain-cups or apertures extending radially through it, and being of different sizes or diameters, so as to hold different quantities of grain for dropping. Fitting within this apertured flange is an adjustable apertured metallic band, I, connected by lugs *i i* to a centrally-pivoted adjusting-lever, K, by means of which the apertures in the band are adjusted into or out of coincidence with the apertures of the flange, accordingly as it is desired to drop or not to drop the grain from the hopper L, which is supported on the frame A, and extends within and furnishes a supply of seed to the space surrounded by the band and flange.

A slotted and graduated segment, M, secured to the traction-wheel serves to indicate the several adjustments provided for, and a thumb-screw, *m*, secures the lever K at the proper points of adjustment, and thus keeps the band and its apertures in place relatively to the flange-apertures.

A curved cap plate or band, N, projecting from the upper part of the hopper covers the upper side of the flange, and prevents dirt from entering the cups from above, and a similar plate, *n*, projecting from the lower part of the hopper closes the bottoms of the cups as they enter the forward portion of the hopper by the revolution of the parts connected to the traction-wheel, and prevents dropping until the cups have arrived over the drop-tube. This drop-tube is supported on a downward projection of the outside plate of the hopper, and it may be of leather or other flexible material, so as to preserve its perpendicular position by its gravity in working up and down hill-sides.

A block or partition, O, is placed in the hopper over the drop-tube, and provided with a brush, P, to prevent dropping of more grain than will fill the particular series of drop-cups set to be used.

Fig. 2 illustrates a flange and band adapted to make four drops in as many different quantities to a revolution.

It will be noted that in this figure are shown four corresponding sets of cups, each set composed of four single cups, diminishing in size from the first to the last, and a band provided with four single apertures of a size corresponding to that of the largest cup in each set.

It will be obvious from this figure that in order to vary the amount of grain dropped at each quarter of a revolution it will only be necessary to adjust the band to the different-sized cups, as it is desired to drop more or less in quantity; but it is a part of my plan, in addition to this variation of quantity, to also vary the number of drops to a revolution, and thus vary the distance of the drops apart in the furrow.

Fig. 6 illustrates the way in which I accomplish this object, and thus adapt my planter to different soils possessing different degrees of fertility, and capable of sustaining the growth of grain in more or less number of hills in a given area. In this figure it will be observed that there are exhibited separate sets of cups, adapted, respectively, to two, three, and four drops to the revolution, and the band is provided with corresponding apertures to be set accordingly, and all these are indicated by the numerals 2, 3, and 4, so as to show their relation and operation under adjustment.

It is obvious that in connection with these separate sets of drop-cups, to obtain the variation of drops per revolution, there may also be the different sizes to effect different amounts of dropping, as illustrated in Fig. 2. All that is required to unite both is to gage the apertures properly, and I have illustrated the two ideas in different figures merely for greater clearness, and to avoid the confusion that would arise from showing the whole in such small compass.

I am aware that apertured flanges and adjustable apertured bands have been used in corn-planters to vary the amount of grain per drop, and this I do not claim; but,

Having thus described my invention, what I claim as my improvements, and desire to secure by Letters Patent, is—

1. In a corn-planter, the combination, substantially as hereinbefore set forth, of a traction-wheel, an apertured annular flange projecting from one side of said wheel, an adjustable apertured band fitting within the flange, the adjusting-lever secured to the apertured flange, and the segment and set-screw.

2. The combination of the sectional frame, the traction-wheel, the hopper and its brush, the apertured flange and adjustable apertured band, the graduated segment and adjusting-lever, and the plates M and N, all constructed and operating substantially as described.

In testimony whereof I have hereunto subscribed my name.

CHARLES MUSGROVE.

Witnesses:
WM. P. THURMAN,
W. L. GARRETT.